Figure 1:
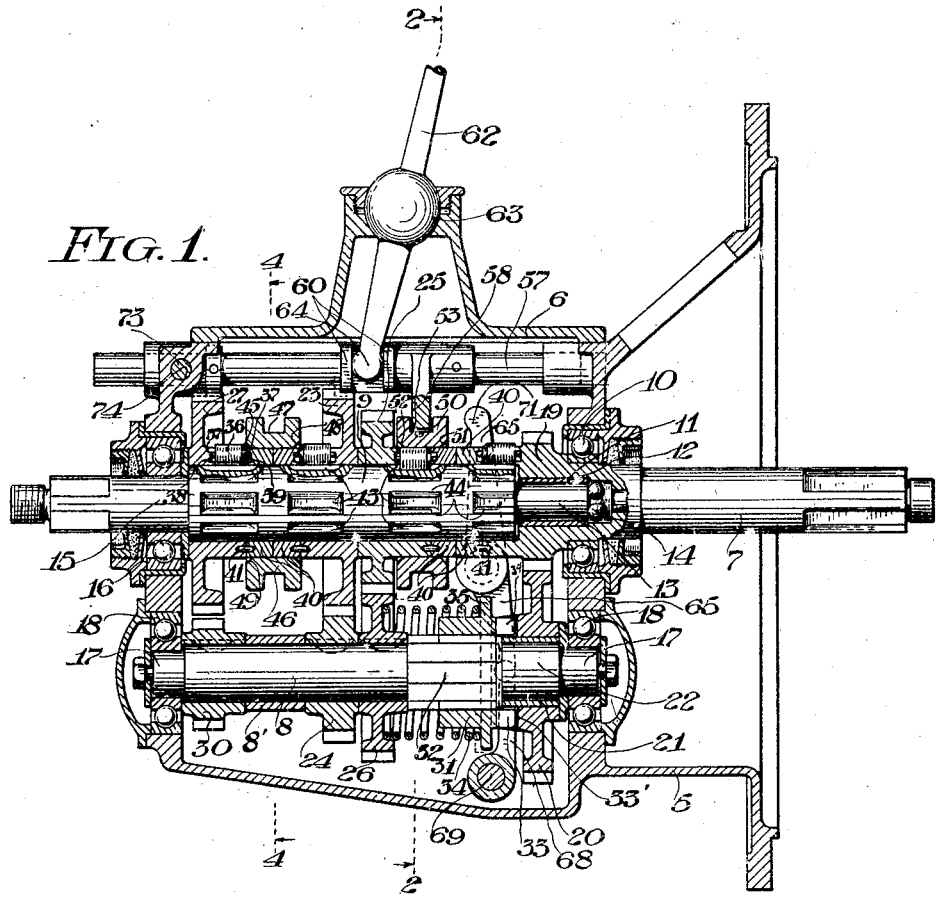

W. A. McCARRELL.
TRANSMISSION CLUTCH.
APPLICATION FILED APR. 25, 1919.

1,380,917.

Patented June 7, 1921.
3 SHEETS—SHEET 1.

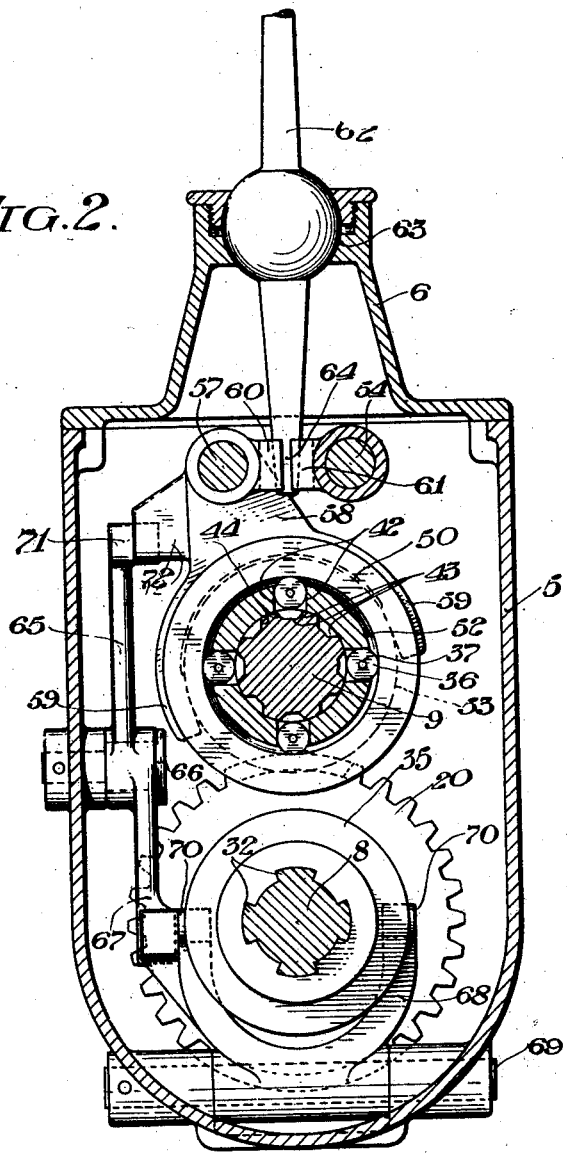

W. A. McCARRELL.
TRANSMISSION CLUTCH.
APPLICATION FILED APR. 25, 1919.
1,380,917.
Patented June 7, 1921.
3 SHEETS—SHEET 3.
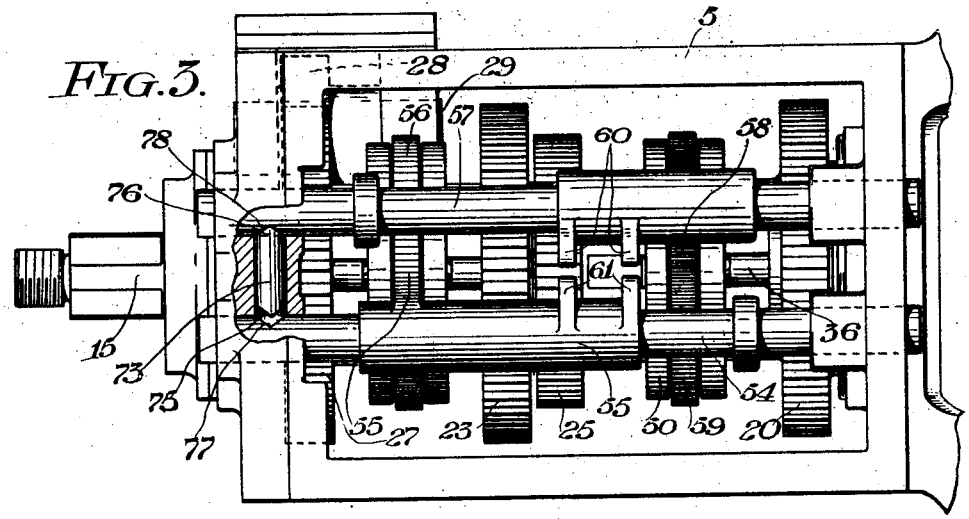
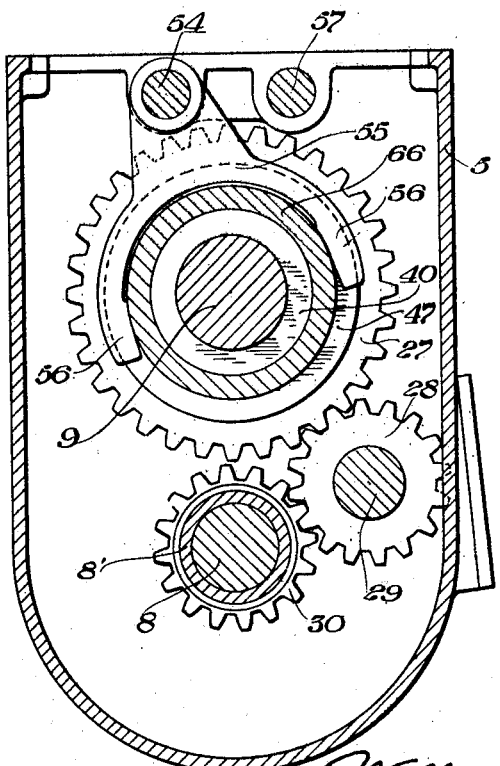
WITNESSES.
INVENTOR
ATTORNEY

UNITED STATES PATENT OFFICE.

WILLIAM A. McCARRELL, OF MILWAUKEE, WISCONSIN.

TRANSMISSION-CLUTCH.

1,380,917.  Specification of Letters Patent.  Patented June 7, 1921.

Application filed April 25, 1919. Serial No. 292,644.

*To all whom it may concern:*

Be it known that I, WILLIAM A. McCARRELL, a citizen of the United States, and resident of Milwaukee, in the county of Milwaukee and State of Wisconsin, have invented new and useful Improvements in Transmission-Clutches, of which the following is a description, reference being had to the accompanying drawings, which are a part of this specification.

The invention relates to transmission clutches.

One of the objects of this invention is to provide what may be termed "roller key clutches" selectively operated to connect up the different change speed gear sets.

A further object of the invention is to provide a clutch in which the clutch elements are rollers connected to a gear loosely mounted on the driven shaft and adapted to be disposed in recesses in said shaft to lock the gear thereto when said rollers are held in said recesses and the gear being disengaged from its driving connection with the shaft by shifting the roller retaining means to permit the rollers to be moved out of engagement with the shaft by cam action and the action of centrifugal force.

The invention further consists in the several features hereinafter described and more particularly defined by claims at the conclusion hereof.

In the drawings: Figure 1 is a vertical sectional view through the transmission mechanism embodying the invention; Fig. 2 is a section taken on the line 2—2 of Fig. 1 with the clutches in disengaged position; Fig. 3 is a top view of the device with the cover and shifting lever removed, parts being shown in section; Fig. 4 is a section taken on the line 4—4 of Fig. 1.

The numeral 5 designates the transmission casing, 6 the cover therefor and 7 the drive shaft, which may form a part of or be directly connected to the crank shaft of the engine.

The transmission mechanism consists of an intermediate shaft 8 and a driven shaft 9, with gearing connections between the shafts 7 and 8 and 8 and 9 for first and second speed and reverse drive and a direct drive connection between the shafts 7 and 9 for high speed.

The end of the shaft 7 is journaled in a ball bearing 10 in the casing and is provided with a socket or bore 11 lined with a bushing 12, in which the reduced end 13 of the shaft 9 is journaled, ball bearings 14 being interposed between the end of the bore 11 and the end 13 to take up the thrust. The other end 15 of the shaft 9 is journaled in a ball bearing 16 in casing 5. The shafts 9 and 7 are in line with each other. The ends 17 of the shaft 8 are journaled in bearings 18 in the ends of the transmission casing 5.

A gear 19 is formed on the end of the shaft 7 and meshes with a gear 20 revolubly mounted on a bushing 21 surrounding a portion 22 of the shaft 8. A gear 23 is loosely mounted on the shaft 9 and meshes with a gear 24 keyed to the shaft 8. A gear 25 is loosely mounted on the shaft 9 and meshes with the gear 26 keyed to the shaft 8. A gear 27 loosely mounted on the shaft 9 meshes with an idler gear 28 on a stud shaft 29, which idler gear meshes with the gear 30 keyed to the shaft 8. A sleeve 8' is mounted on the shaft 8 between the gears 24 and 30.

For the first speed the drive is through the gears 19 and 20, shaft 8, and gears 24 and 23 to the shaft 9; for second speed through gears 19 and 20, shaft 8, and gears 26 and 25 to shaft 9; for reverse the drive is through gears 19 and 20, shaft 8, gears 30, 28 and 27, and for high speed the drive is direct from the shaft 7 to the shaft 9, the driving connections being effected as hereinafter described.

The gear 20 is normally drivingly connected with the shaft 8 by means of a claw clutch consisting of a member 31 slidably and non-rotatably keyed to a ribbed portion 32 of the shaft 8 and provided with clutch face 33 engaging a clutch face 33' on the gear 20, which faces are normally held in engagement with each other by means of a spring 34 interposed between an annular flange 35 on the clutch member 31 and the gear 26.

The gears 23, 25, 27 and the shaft 7 are adapted to be selectively locked in driving relation with the shaft 9 by means of what may be termed "roller key clutches." Each of these clutches embodies a plurality of radially disposed rollers 36 having pin ends 37 which are mounted in radially extending sets of grooves or recesses 38 and 39 in the gear to be locked and a collar 40 disposed adjacent thereto, each of the collars 40 being respectively secured to the gear with which it coöperates by means of pins 41. The rollers 36 are slidably movable in radially disposed slots 42 in the hub of each gear. For the purpose of locking the gears to the shaft 9 by means of the rollers 36, each set of rollers is adapted to be moved into radially disposed recesses 43 in the shaft 9 when said recesses are in line with the slots 42. Each of these recesses has beveled sides 44 so that when the gear is loose on the shaft the rollers associated with it will be prevented from locking said gear to said shaft by the cam action of the inclined sides 44 upon the rollers. This cam action is facilitated by the fact that the depth of the recesses 43 is less than the radius of the rollers and the width of each recess 43 is less than the diameter of a roller. Disengagement of the rollers with the shaft is also effected by the action of centrifugal force. The ends 45 of the rollers 36 for each clutch, which ends are disposed adjacent the collars 40 in each instance, are beveled so as to permit a clutch shifting member to be moved laterally toward the respective gear to be locked in engagement with the shaft and thereby force the rollers carried by this gear into the recesses 43 in the shaft and allow said member to be moved over the rollers to maintain said rollers in locking engagement with the shaft.

For first and reverse speed a clutch shifting member 46 is slidably mounted upon the collars 40 on the shaft 9 between the hubs for the gears 23 and 27. This member 46 is in the form of a collar provided with an annular groove 47 having an annular beveled portion 48 adjacent the gear 23 and an annular beveled portion 49 adjacent the gear 27. By shifting the member 46 toward the gear 23 the beveled portion 48 will strike the beveled ends of the clutch rollers for this gear, force them into the recesses in the shaft and hold them therein so that the gear 23 will be drivingly connected with the shaft 9 to effect first speed, as previously pointed out, and when the shifting member 46 is moved toward the gear 27 to dispose and maintain its clutch rollers in locking engagement with the recesses in the shaft 9, the shaft 9 will be reversely driven from the shaft 7 through the gear connections previously described.

Another clutch shifting member 50 is slidably mounted on the collars 40 on the shaft 9 between the hubs of the gears 25 and 19 and is provided with annular bevels 51 and 52 and an annular groove 53, which are similar to the beveled portions and groove of the member 46. When the member 50 is shifted toward the gear 19 the beveled portion 51 will force the rollers adjacent the gear 19 into the recesses in the shaft 9 and hold them therein to directly lock the shafts 7 and 9 to each other, and when the member 50 is shifted to bring the beveled portion 52 into engagement with the rollers for the gear 25, said rollers will be moved into the recesses 43 in the shaft 9 and be secured therein as shown in Fig. 1, in which instance the shaft 9 will be driven at second speed from the shaft 7 by means of the gearing connections previously described.

The clutch member 46 is shifted by means of a shifting shaft 54 carrying a forked arm 55, the ends 56 of which are disposed in the annular recess 47. The clutch member 50 is shifted by means of a shifting shaft 57 carrying a forked arm 58, the ends 59 of which are disposed in the annular recess 53 in the member 50. The forked member 58 has inwardly projecting spaced lugs 60, and the forked member 55 has similar lugs 61.

Selective actuation of the clutches is effected by a shifting lever 62 which has a ball and socket bearing connection 63 with the top 6 of the casing and has an end 64 movable into coöperation with the lugs 60 or with the lugs 61. When the end 64 is moved into engagement with the lugs 60 and is oscillated so as to move the shaft 57 toward the left from neutral position, as shown in Fig. 1, the second speed gear set will be thrown in, and when shifted toward the right from neutral position the third speed will be thrown in, due to the shifting of the collar 50 as previously described. When the end 64 is moved over to coöperate with the projection 61 and the shaft 54 moved toward the left from neutral position, the reverse gearing connection will be thrown in, and when the shaft 54 is shifted toward the right from neutral position, the first speed gears will be thrown in by the shifting of the member 46 with the shaft 54. In neutral position the collars 46 and 50 surround the collars 40 as shown at the left in Fig. 1.

For third speed, since the shaft 7 is in this case directly connected with the shaft 9, it is not necessary to drive through the shaft 8, but since the gear 19 is in mesh with the gear 20, which is clutched to the shaft 8, provision is made for releasing the gear 20 from driving engagement with the shaft 8 and consists of a clutch shifting member 65 pivotally mounted intermediate its ends upon a shaft 66 and engageable at one end 67 with a forked arm 68 mounted on a shaft 69 and having its ends 70 engageable with the flange 35 of the clutch member 31. The other end 71 of the lever 65 is engageable with a projection 72 on the forked arm 58 when said arm is shifted by the shifting of the shaft 57 toward the right to effect throwing in of the clutch to connect the gear 19 with the shaft 9, which, as previously described, is effected by shifting the member 50 to a position adjacent the gear 19. By so doing, the forked arm 58 engages the lever 65, swings the same about its pivot and the lower end 67 of said lever then swings the arm 68 toward the left and thereby moves the member 31 out of clutching connection with the gear 20 so that the gear 20 turns freely on the shaft 8.

In order to prevent the throwing in of more than one clutch at a time, movement of only one of the shifting shafts is permitted at a time by means of a shiftable locking pin 73, which is slidably mounted in a bore 74 in the casing and has beveled ends 75 and 76 engageable respectively with notches 77 and 78 in the shafts 54 and 57. The length of this pin is such as to permit the movement of one of the shifting shafts but does not permit movement of both of the shifting shafts at a time, and when one of the shafts is moved from its normal position the cam action between the end of the pin and the notch in the shaft will force said pin into locking engagement with the other shifting shaft.

It is to be understood that this invention is not limited to any specific form or arrangement of parts, except in so far as said limitations are specified in the claims.

What I claim as new and desire to secure by Letters Patent is:

1. In a transmission mechanism, the combination of a shaft having radially disposed recesses therein, a member loosely mounted thereon and having a hub provided with radially disposed slots and radially disposed recesses in the ends of said slots, rollers disposed in said slots and having reduced end portions disposed in said recesses in said hub, and means for moving said rollers into said recesses to lock said member to said shaft.

2. In a transmission mechanism, the combination of a shaft having radially disposed recesses therein, a member loosely mounted thereon and having a two part hub provided with radially disposed slots and radially disposed recesses in the ends of said slots, rollers disposed in said slots and having reduced end portions disposed in said recesses in said hub, one part of said hub being integral with said member and the other part being connected to said first part to retain the rollers in place, and means loosely mounted on the hub for moving said rollers into said recesses on the shaft.

3. In a transmission mechanism, the combination of a shaft having radially disposed recesses therein with inclined sides, a member loosely mounted thereon and provided with radially disposed guideways, rollers mounted in said guideways, the width and depth of said recesses being less than the diameter of the rollers, and means for moving said rollers partly out of said guideways and into said recesses and retaining them therein to lock said member in driving engagement with said shaft.

4. In a transmission mechanism, the combination of a shaft having radially disposed recesses therein, a member loosely mounted thereon and having a hub provided with radially disposed slots, rollers disposed in said slots, a pin and slot connection between the ends of the rollers and said hub to limit the outward movement of the rollers, and means for moving said rollers into said recesses to lock said member to said shaft.

In testimony whereof I affix my signature in presence of a witness.

WILLIAM A. McCARRELL.

Witness:
R. S. C. CALDWELL.